United States Patent
Goertz

(10) Patent No.: US 11,256,689 B2
(45) Date of Patent: Feb. 22, 2022

(54) ITERATIVELY EXECUTING AN ALGORITHM ACROSS PARTITIONS IN PARALLEL

(71) Applicant: SAP SE, Walldorf (DE)

(72) Inventor: Peter Goertz, Durmersheim (DE)

(73) Assignee: SAP SE, Walldorf (DE)

(*) Notice: Subject to any disclaimer, the term of this patent is extended or adjusted under 35 U.S.C. 154(b) by 77 days.

(21) Appl. No.: 16/713,649

(22) Filed: Dec. 13, 2019

(65) Prior Publication Data
US 2021/0182292 A1    Jun. 17, 2021

(51) Int. Cl.
| | |
|---|---|
| *G06F 16/2453* | (2019.01) |
| *G06F 16/22* | (2019.01) |
| *G06F 16/2458* | (2019.01) |
| *G06F 16/242* | (2019.01) |
| *G06F 16/27* | (2019.01) |

(52) U.S. Cl.
CPC .... *G06F 16/24532* (2019.01); *G06F 16/2282* (2019.01); *G06F 16/2448* (2019.01); *G06F 16/2471* (2019.01); *G06F 16/278* (2019.01)

(58) Field of Classification Search
CPC ... G06F 16/278; G06F 11/2023; G06F 9/5061
USPC ............................................. 707/706
See application file for complete search history.

(56) References Cited

U.S. PATENT DOCUMENTS

| | | | |
|---|---|---|---|
| 10,657,154 B1* | 5/2020 | Dugar | G06F 9/52 |
| 2009/0177600 A1* | 7/2009 | Sundararajan | G06N 3/126 706/13 |
| 2015/0007171 A1* | 1/2015 | Blake | G06F 9/45558 718/1 |

* cited by examiner

*Primary Examiner* — Hung T Vy
(74) *Attorney, Agent, or Firm* — Sterne, Kessler, Goldstein & Fox P.L.L.C.

(57) ABSTRACT

The system described herein provides for iteratively executing an algorithm across partitions of a database table, in parallel. An instance of the algorithm may be executed for each partition of a database table across different hosts, in parallel, using predefined control data. The system may receive a result corresponding to each partition in response to executing algorithm on the respective partition. The system may determine a result corresponding to each of the partitions satisfies predefined criteria. The predefined criteria is defined by the user. In response to determining that the result corresponding to a partition fails to satisfy the predefined criteria, the system may modify the control data and execute an instance of the algorithm on each of the partitions using the modified control data.

14 Claims, 12 Drawing Sheets

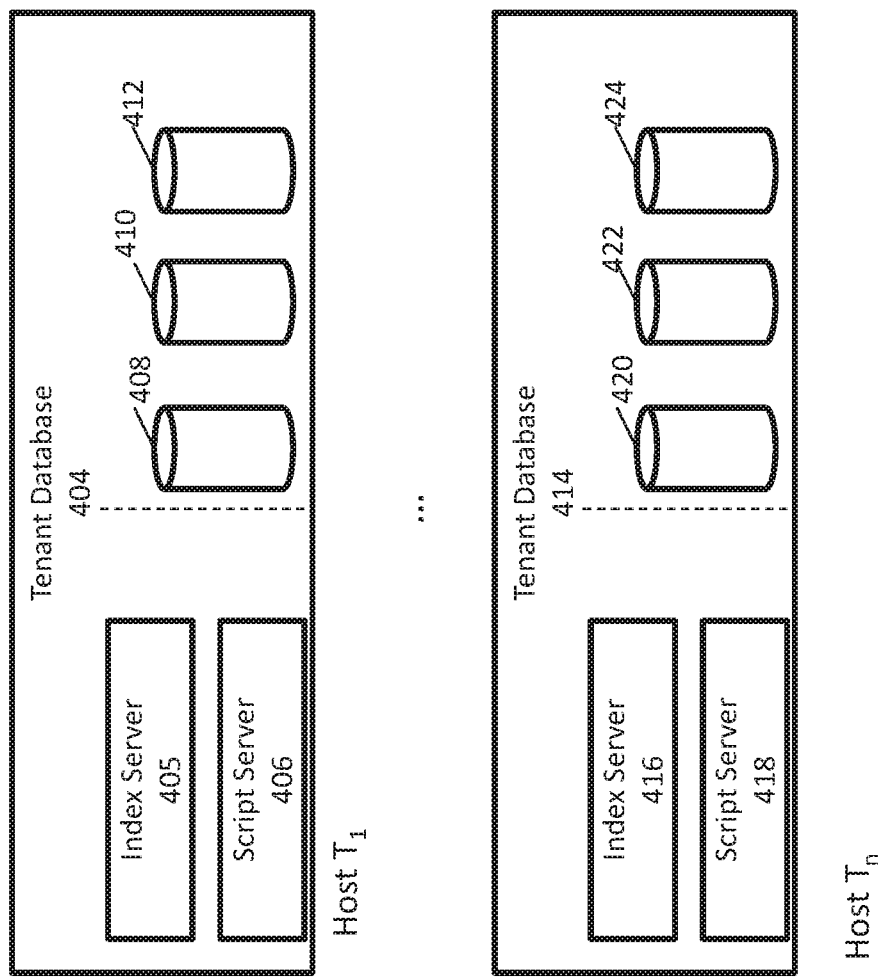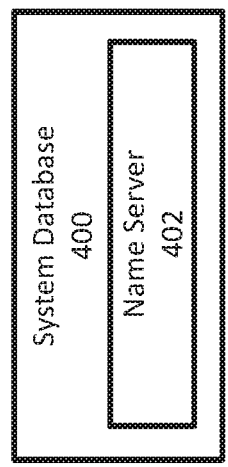
FIG. 4

ITERATIVELY EXECUTING AN ALGORITHM ACROSS PARTITIONS IN PARALLEL

BACKGROUND

Corporations, educational institutions, and other entities that warehouse large amounts of data are increasingly turning to predictive or machine learning algorithms to better understand their data. The accuracy of the outputs of the predictive or machine learning algorithms may vary based on the data used to execute the algorithms. The data itself may be stored in a distributed database, for example, distributed over multiple different partitions across different hosts. Individually and serially executing the algorithms across these partitions may be computationally expensive and cumbersome to process.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 4 is a block diagram of a system database and tenant databases and according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
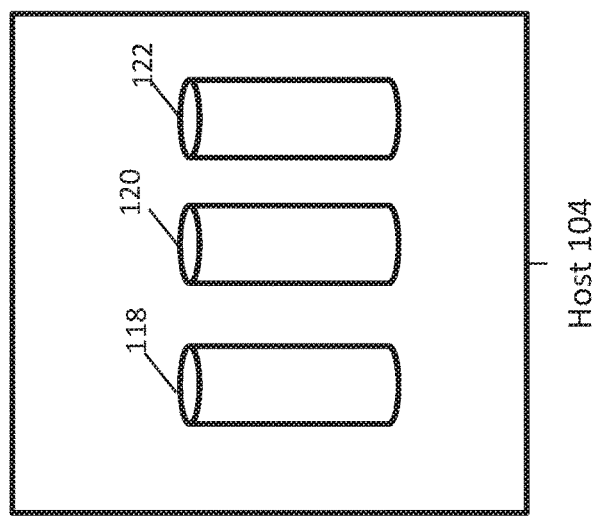
FIG. 1 is a block diagram of hosts storing partitions of a database table according to an example embodiment.

The system, method, and non-transitory computer readable medium described herein provides for iteratively executing an algorithm across partitions of a database table, in parallel. This allows corporations, educational institutions, and other entities that warehouse large amounts of data to execute iteratively execute different types of predictive or machine learning algorithms across a distributed database until they are satisfied with the result, without manually intervening in the process.

As an example, retail stores may execute predictive or machine learning algorithms to generate forecast sales data. These algorithms are executed using large amounts of persistence data and predefined control data. The data may be spread across different partitions of a database table across different hosts. The algorithms may be embodied as Application Function Library (AFL).

The AFL includes different application functions and the functions are grouped in the AFL based on a given topic such as Predictive Analysis Library (PAL) and the Business Function Library (BFL). The application functions are written in C++ and called from the outside to perform data intensive and complex operations. The application functions may be used to execute predictive or machine learning algorithms.

The retail store may implement the system, method, and non-transitory computer readable medium described herein for iteratively executing the predictive or machine learning algorithms across partitions of a database table, in parallel, to generate an accurate forecast of sales data.

In an embodiment, a user may transmit a request for executing an algorithm on partitions of a database table. An instance of the algorithm may be executed for each partition of a database table across different hosts, in parallel, using predefined control data. The algorithm may be independently executed on each partition such that calculations of the algorithm may be executed on the partition without the need of any other partition. The system may receive a result corresponding to each partition in response to executing the algorithm on the respective partition. The system may determine a result corresponding to each of the partitions satisfies predefined criteria. The predefined criteria is defined by the user. In response to determining that the result corresponding to a partition fails to satisfy the predefined criteria, the system may modify the control data and execute an instance of the algorithm on each of the partitions using the modified control data.

The data stored in each partition of the database table is modified in response to an initial execution of the algorithm on the partitions. The system may generate a state of the partition including the modified data. The system may re-execute the algorithm on the state of the partition rather than the data stored in the partition of the database table. By doing so, the system avoids having to transform and prepare the data stored in the database table a subsequent time when re-executing the algorithm across all the partitions.

FIG. 1 is a block diagram of hosts storing partitions of a database table according to an example embodiment. Hosts 100-104 may be part of a distributed database configured to store partitions of a database table. Host 100 may store partition 106, 108, and 110. Host 102 may store partition 112, 114, and 116. Host 104 may store partition 118, 120, and 122. Each of the partitions 106-122 may store data included in the database table. The database table may be partitioned by various partitioning algorithms such as range, hash, round-robin, and/or the like.

Algorithms may be executed using the data stored in each or some of the partitions 112-122. The algorithms may isolate each partitions 112-122 such that data from a given partition is not necessary to complete execution of an algorithm while executing the algorithm using data stored in an another partition. In response to executing the algorithm using the data of a partition, an output may be generated. In an embodiment, the algorithms may be predictive, machine learning, or artificial intelligence algorithms.

Figure 2:
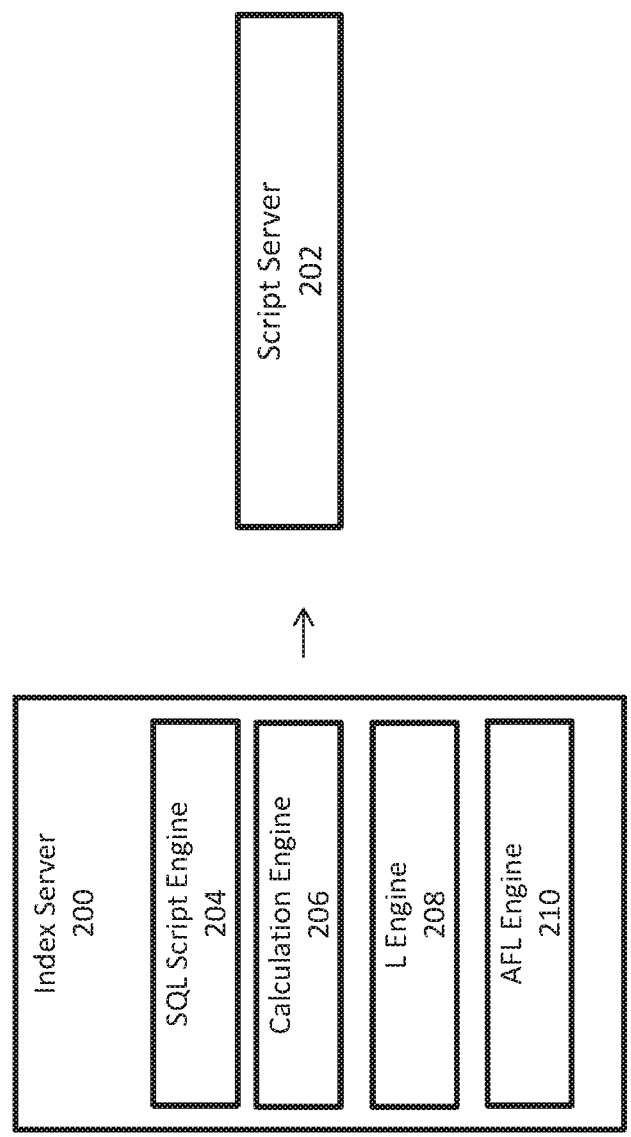
FIG. 2 is a block diagram of an index server and a script server according to an example embodiment.
Figure 3:
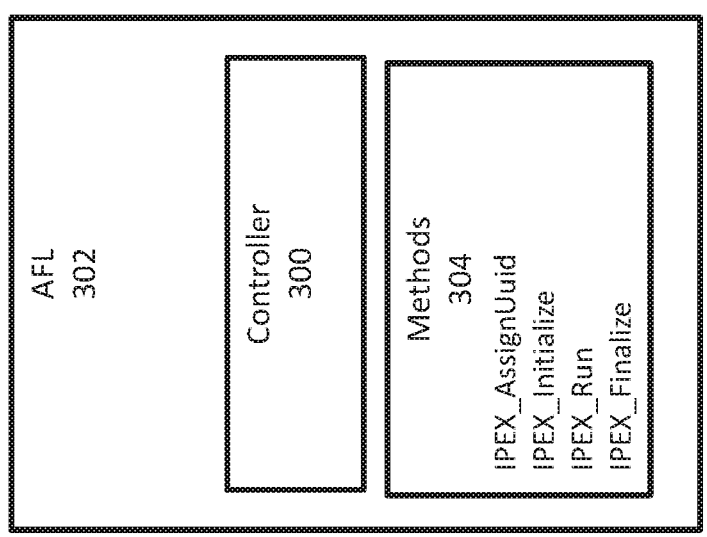
FIG. 3 is a block diagram of an AFL according to an example embodiment.

FIG. 2 is a block diagram of an index server 200 and a script server 202 according to an example embodiment. FIG. 3 is a block diagram of an AFL 302 according to an example embodiment. FIGS. 2-3 will be described herein concurrently.

With reference to FIG. 2, the index server 200 and the script server 202 may reside in a host and may be configured to execute a specified algorithm using the data stored in partitions stored in the host. The index server 202 may include a SQL script engine 204, a calculation engine 206, an L engine 208, and an AFL Engine 210.

The index server 200 may receive a request to execute an algorithm on data stored in partitions in a database, in parallel. The algorithm may be embodied as an application function library (AFL). The AFL may include application functions programmed in C++. The AFL may implement predictive or machine learning algorithms.

Each AFL implements a component class, and the application functions are the methods of the component class. The component class derives from an AFL-specific interface and from the general base class AFLBase. The methods of AFLBase provide access to an AFL engine 210 via certain callbacks. When the component class is instantiated the callbacks to the AFL engine 210 are registered in AFLBase.

An application function is embedded into an AFLLANG procedure. Depending on the flexibility of the application function, one or more procedures may belong to the application function. AFLLANG procedures may have a SQLSCRIPT like interface and are implemented via calculation scenarios which call L plan operators of type AFL. The L engine 208 may execute the L plan operators. The L plan operator invokes the application function via an AFL call wrapper.

Application functions are executed on the script server 202. The call is routed by the calculation engine from the index server 200 to its next script server 202 according to the topology known to a name server.

The index server 200 may receive a call to process an AFLLANG procedure. The AFLLANG procedure may control the overall execution of the algorithm. The procedure may include an outer calculation scenario and an inner calculation scenario. The inner calculation scenario executes the algorithm on specified partitions.

With reference to FIG. 3, a controller 300 may be an application function in an AFL 302. In one embodiment, the controller 300 may receive name of a worker application function, name of the specified partitions on which the algorithm is to be executed, and control data, as inputs. The controller 300 and worker application function may belong to the same AFL 302 or may belong to different AFLs. The controller 300 may execute calls to methods 304. The methods 304 include:

IPEX_AssignUuid
IPEX_Initialize
IPEX_Run
IPEX_Finalize

The controller 300 calls methods 304 back to the AFL engine 210. These callbacks are methods offered by AFLBase. IPEX_Run may be called as often as needed to reach a given result quality, and the others are called one time. Initialize, run, and finalize execute the worker with three different modes. The callbacks trigger actions on all script servers 202 on all of the hosts. The script server 202 where the controller 300 resides communicates with all other script servers. This communication is either done by the AFL engine 210 itself or by utilizing the calculation engine 206 which then initiates the communication.

The call to IPEX_AssignUuid (AFLBase_Status IPEX_AssignUuid(ltt::string & Uuid) const) returns a unique identifier (ID). This unique ID may be assigned to the calculation scenario for the parallel execution.

The call to IPEX_Initialize (AFLBase_Status IPEX_Initialize(const char
* Area, const char*Function, const char*Schema, const char
* Table, const ltt::string & Uuid, const ltt_adp::vector<const ltt::smartptr_handle<TRexCommonObjects::InternalTable>> & ITabs,
ltt::smartptr_handle<TRexCommonObjects::InternalTable> & OTab, ltt::string
& ErrorText) const;) is for building all necessary internal structures. The input is the name of the worker (Area & Function), name of the partitioned table (Schema & Table), further input data, e.g., given by the user to the AFLLANG procedure of the controller. Output is an internal table with which the worker returns information to the controller 300.

FIG. 4 is a block diagram of a system database 400 and tenant databases 404 and 414 according to an example embodiment. The system database 400 may include a name server 402. The tenant database 404 may include an index server 405, a script server 406 and partitions 408-412 of a database table. The tenant database 414 may include index server 416, script server 418 and partitions 420-224. The tenant database 404 may reside on Host $T_1$ and tenant database 414 may reside on Host T_1.

In an embodiment, a 1:1 relationship for an index server to script server may be maintained for each host. In this regard, a single index server and single script server may reside on a host. Multiple partitions of a database table may be stored on a host. The name server 402 may keep track of the index servers and script servers of each of the hosts. The name server 402 may know the overall topology of the index servers and script servers on each of the hosts.

The index servers 405 and 416 may receive the request or instructions for executing an algorithm on the partitions 408-412 and 420-424 respectively. The script servers 406 and 418 may execute the algorithm on the respective partitions 408-412 and 420-424.

Figure 5:
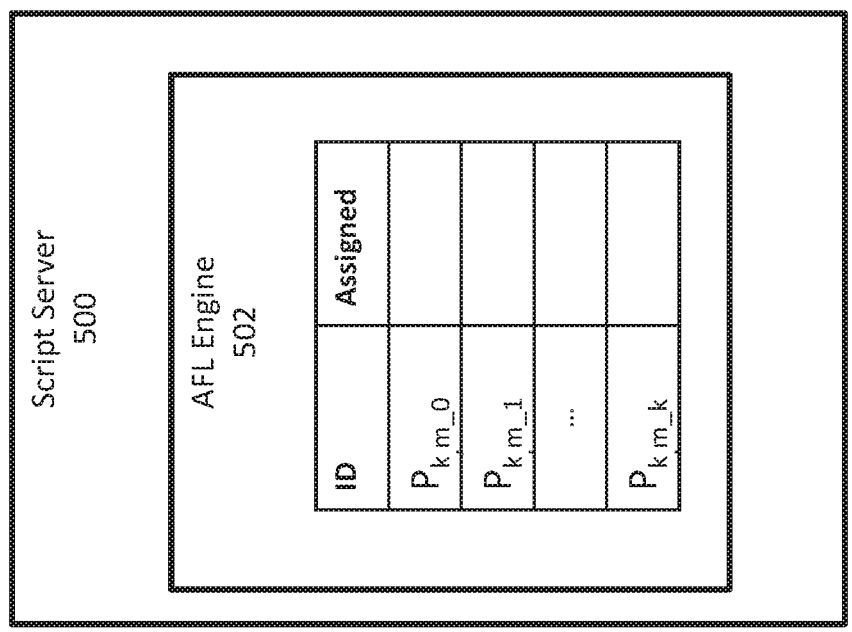
FIG. 5 is a block diagram of a script server according to an example embodiment.

FIG. 5 is a block diagram of a script server 500 according to an example embodiment. A given number m_k of partitions and corresponding states may reside on a given index server k and its script server 500. The script server 500 may include an AFL engine 502. As described above, each host (or node) may store multiple partitions of a database table. Each partition may be assigned an identifier. Each of the hosts may include a script server 500 and an AFL engine 502. The AFL engine may catalog and store the identifiers of the partitions. For each host the IDs of the partitions located on the host are selected from a catalog and stored in an internal structure in the AFL engine 502 of the script server 500 on the host. A Boolean field may be stored along with the partition identifier to indicate that the identifier has been assigned to the partition.

The script server 500 may determine the partitions on which to execute the algorithm on using the partition identifiers. For example, the script server 500 may receive the partition identifiers in the instructions to execute the algorithm.

Algorithms including calculation scenarios may be executed on the partitions of the database stable stored in the hosts. A calculation scenario with a physical table data source may have a PartitionedExecutionFlag set. If the flag set to true and the calculation scenario has an L-operator of type AFL the application function is invoked by the L-operator. The application function is executed on each partition of the database table locally and the m instances of the application function in case of n partitions are executed in parallel.

The calculation scenario may also have TRex internal tables as inputs, and a TRex internal table as output is produced by a union-operator which joins the results of the m instances of the application function. Each execution of the calculation scenario reads the data from all partitions and invokes the application function.

A first calculation scenario may be with the partitioned table specified by schema and table as input and with an AFL-L-operator which executes the application function specified by area and function. The calculation scenario has as additional inputs the internal tables provided by ITabs and an output table including the internal table specified by OTab.

A second calculation scenario is structurally identical to the first calculation scenario except that, the physical table input may not by the partitioned table but rather an empty copy of the table. The empty table is created by "create table < . . . > like < . . . > with no data". The empty copy of the table is referred to as a clone table. The first calculation scenario is referred to as original calculation scenario, and the second calculation scenario is referred to as clone calculation scenario.

Figure 6:
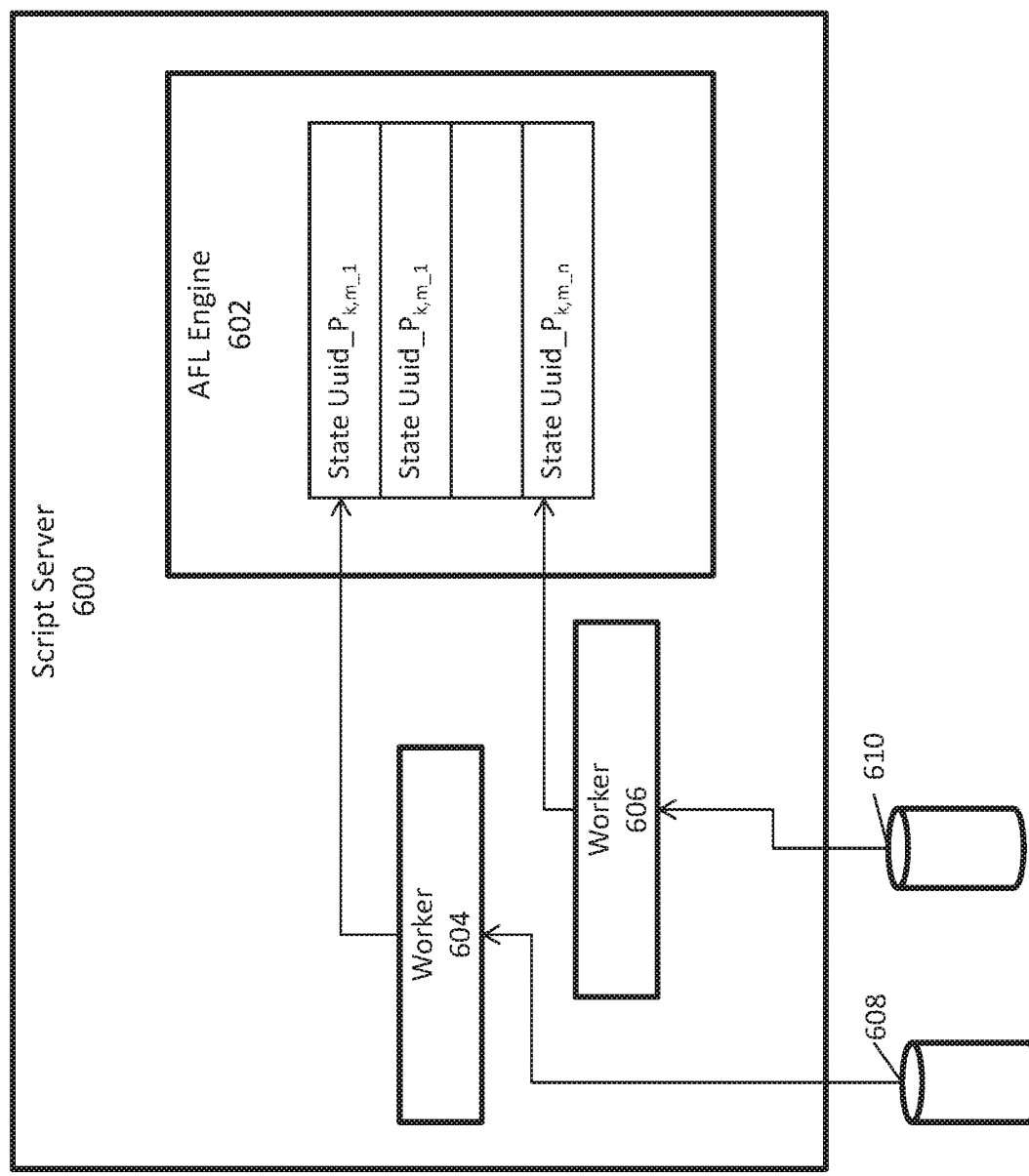
FIG. 6 is a block diagram of a script server according to an example embodiment.

FIG. 6 is a block diagram of a script server 600 according to an example embodiment. The script server 600 may include an AFL engine 602 and workers 604 and 606. The workers 604 and 606 may be in communication with partitions 608 and 610. The workers 604 and 606 may be application function workers configured to execute algorithms on the partitions 608 and 610. The workers 608 and 610 may be executed in three different modes, initialize, run, and finalize.

During the execution of the original (first) calculation scenario the worker 604 or 606 is invoked in initialize mode on each partition 608 and 610, respectively. The workers 604 and 606 may transform and prepare data stored in the partitions 608 and 610 for further processing. The transformed data is stored in an AFL state (or state). Each state corresponds with a partition. A unique identifier is generated for the state. The unique identifier includes a Uuid and the respective partition identifier. The state is an AFL engine 602 internal storage structure which is identified by its unique identifier. The stat is available for usage until it is deleted.

During an execution of the second (or clone) calculation scenario, the workers 604 and 606 may execute the algorithm on the stored states rather than the persistence data stored in the partitions 608 and 610. By doing so, the workers 604 and 606 avoid having to transform the persistence data again when re-executing the algorithm. The state corresponding to partition 608 may be State Uuid_$P_{k, m\_0}$ and the state corresponding to partition 610 may be State Uuid_$P_{k,m\_n}$.

Figure 7:
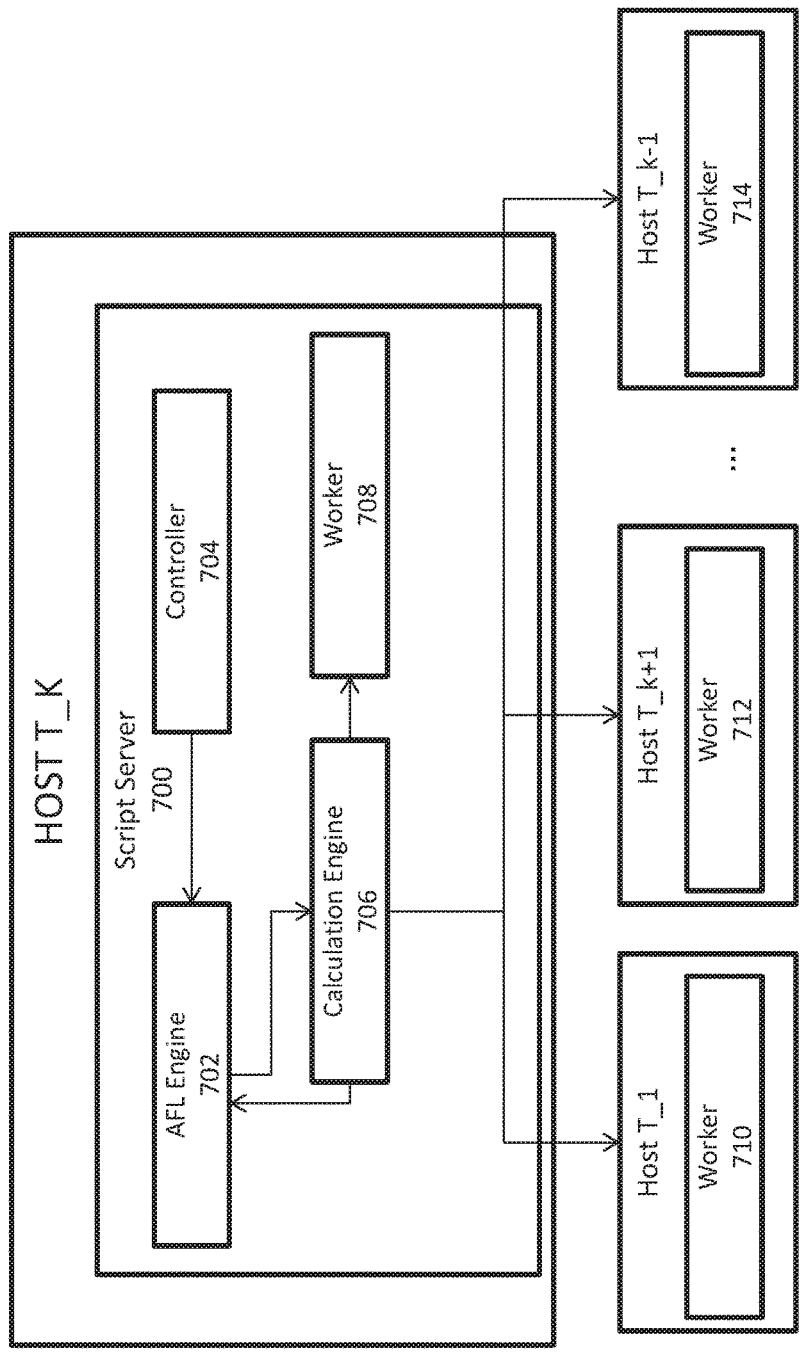
FIG. 7 is a block diagram of a script server communicating with various hosts according to an example embodiment.

FIG. 7 is a block diagram of a script server 700 communicating with various hosts according to an example embodiment. The script server 700 may reside on Host T_k. The script server 700 may include an AFL engine 702, controller 704, calculation engine 706, and worker 708. The calculation engine 706 may communicate with hosts T_1, T_k−1, and T_k+1. Host T_1 may include a worker 710, host T_k−1 may include worker 712 and host T_k+1 may include worker 714.

After reading and transforming the data in the original (first) calculation scenario the transformed data may be stored in states to be accessed during a clone (second) calculation scenario. The clone calculation scenario is built on an empty clone of the partitioned table, hence it follows the same partitioning and invokes in parallel the respective number of worker instances on each script server. The worker instances are invoked with mode RUN by IPEX_Run (AFLBase_Status const ltt::string & Uuid, const ltt adp::vector<const ltt::smartptr_handle <TRexCommonObjects::InternalTable>> & ITabs, ltt::smartptr_ handle<TRexCommonObjects::InternalTable> & OTab, ltt:: string & ErrorText) const;)

The controller 704 may invoke IPEX_Run. In response to invoking IPEX_Run the AFL engine 702 may execute the clone calculation scenario using the calculation engine 706. The calculation engine 706 may instruct the workers 708-712 to execute the clone calculation scenario on the sates corresponding to partitions stored on the respective hosts.

Figure 8:
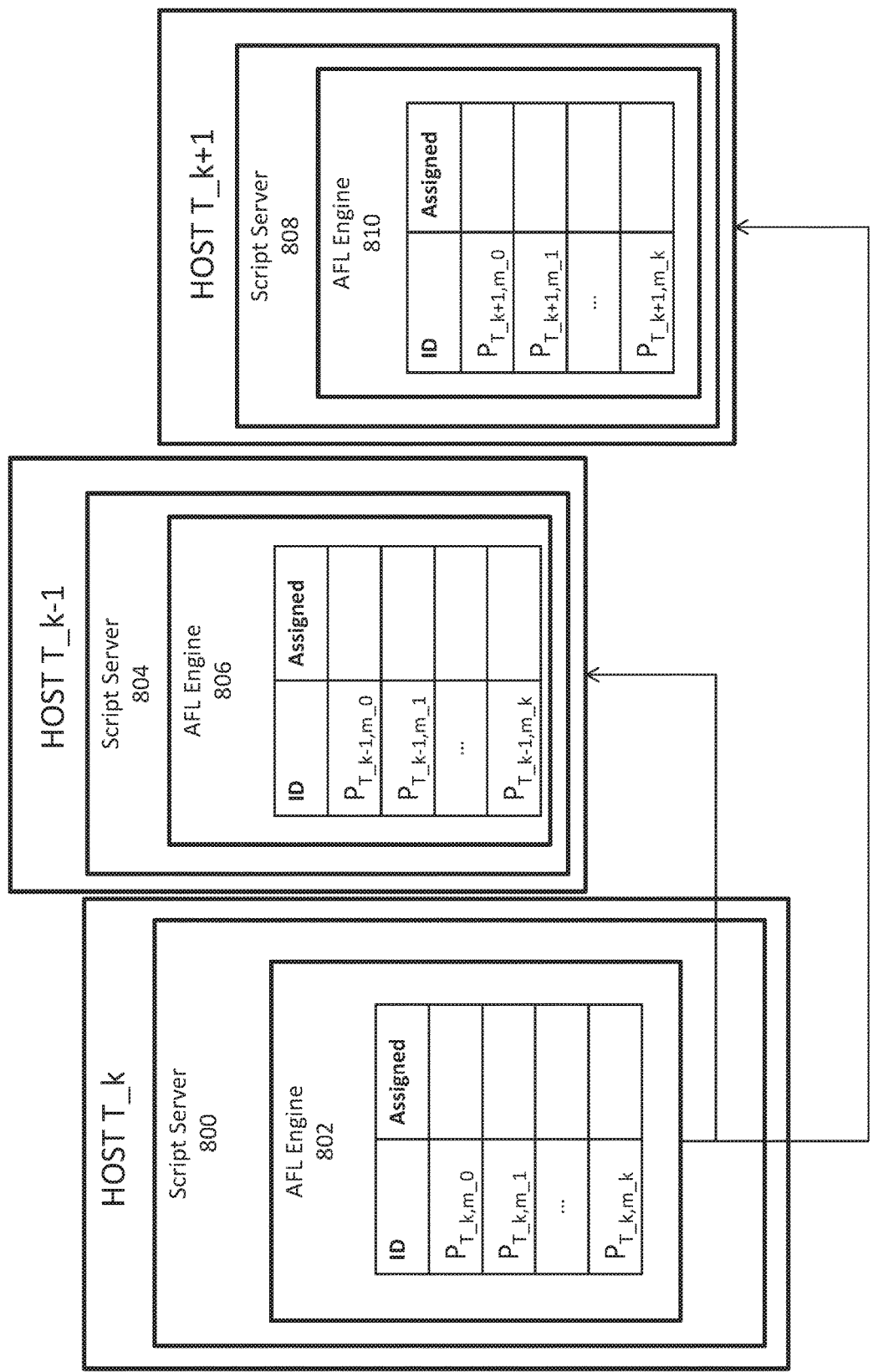
FIG. 8 is a block diagram of a script server communicating with various hosts according to an example embodiment.

FIG. 8 is a block diagram of script servers on various hosts communicating with various hosts according to an example embodiment. Host T_k may include script server 800, host T_k−1 may store script server 804, and host T_k+1 may store script server 808. The script server 800 may include an AFL engine 802, script sever 804 may include an AFL engine 806, and script server 808 may include an AFL engine 810.

Once a worker instance is executed by the clone calculation scenario of the index server's script server, the worker finds a state corresponding to a partition for executing the algorithm. The identifiers of all partitions belonging to an index server are stored in an internal structure in the AFL engine of the index server's script.

Access to this storage structure is synchronized by a mutex. In the event, m instances of the worker are invoked in a script server while the corresponding index server holds n partitions, each instance calls IPEX_AssignPartID and so each worker instance receives the unique identifier of a partition belonging to the index server. When a unique ID is assigned to a worker the unique identifier is flagged as "assigned".

A state identifier includes a Uuid and the partition identifier stored in the AFL engine 802-808. The worker reads the state identified by the Uuid and the partition identifier assigned to the worker and runs the algorithm on the state data. The worker may execute the algorithm with modified control data given by ITabs. The worker may further modify the state data for subsequent use.

Once all worker instances on all script servers have finished executing the algorithm, the control is again returned to the AFL engine of the script server where the controller resides. Before the AFL engine returns to the controller it resets the assigned flag for all partition identifiers in all script servers. For the local script server the partition identifiers assigned flags are reset directly, for the other script servers a remote request is sent to each script server to reset the assigned flags of the script servers.

For resetting the flags for the partition identifiers, the AFL engine in each script server determines whether if each identifier was assigned. In the event an identifier was not assigned then this would mean that the algorithm did not execute on the corresponding state in the currently performed iteration, and hence an error is generated. In the event each partition identifier has been assigned, then for each ID the assigned flag is set to false.

As an example, the controller may reside in the script server 800. The AFL engines 802, 806, and 810 may store the partition identifiers and a flag indicating whether they have been assigned to a worker. Once the worker has completed executing the algorithm on a given partition, the assigned flag of the given partition may be reset. The AFL engine 802 may directly reset the assigned flags of the partitions identifiers stored in the AFL engine 802. The assigned flags for the partition identifiers stored in AFL engine 806 and 810 may be remotely reset by the AFL engine 802. The AFL engines 802, 806, and 810 may store partition identifiers of the partitions residing on the corresponding hosts T_k, T_k−1, and T_k+1.

Once all partition IDs are reset, the AFL engine returns the IPEX_Run call to the controller. The controller may determine whether the results or outputs from each partition in response to executing the algorithm satisfy predefined criteria. In response to determining, the results or outputs satisfy the predefined criteria the finalize method IPEX_Finalize (AFLBase_Status const ltt::string Uuid, const ltt adp::vector<const ltt::smartptr_handle<TRexCommon Objects::InternalTable>> & ITabs, ltt:: smartptr_handle<TRexCommonObjects::InternalTable> & OTab, ltt::string & ErrorText) const) may be called. Each worker may also delete each state identified by the Uuid and the partition ID, assigned to the worker. The AFL engine on each script server may remove the storage structure for the IDs of the table partitions. The controller builds the output table which is returned by the AFLLANG procedure to a user.

In the event there is an error during the execution of the algorithm or otherwise, IPEX_Cleanup (AFLBase_Status IPEX_Cleanup(const ltt::string & Uuid, const ltt_adp:: vector<const ltt::smartptr_handle<TRexCommonObjects:: InternalTable>> & ITabs, ltt::smartptr_handle <TRexCommonObjects::InternalTable> & OTab, ltt::string & ErrorText) const;) function may be called.

Figure 9:
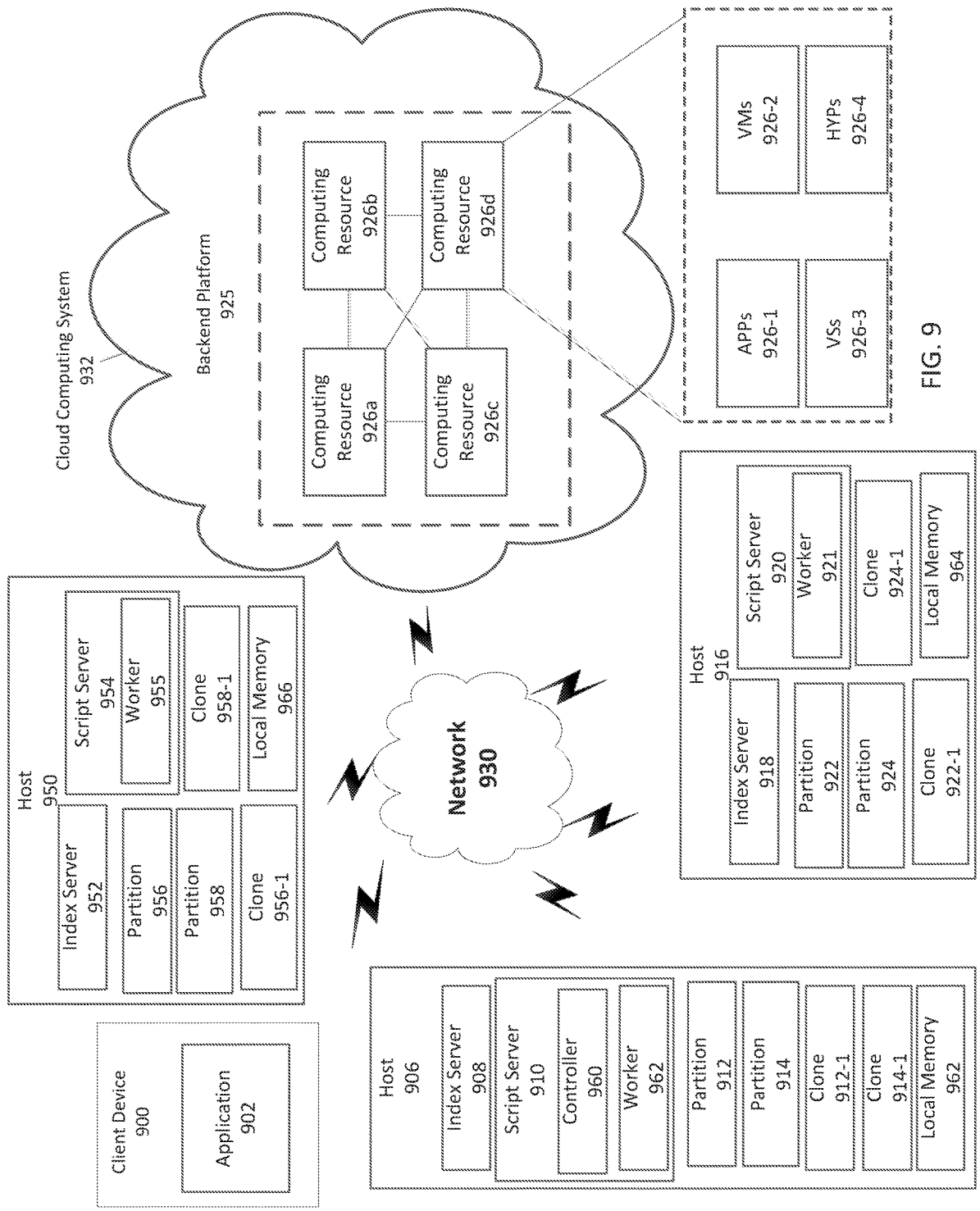
FIG. 9 is a block diagram of an example environment in which systems and/or methods described herein may be implemented according to an example embodiment.

FIG. 9 is a block diagram of an example environment in which systems and/or methods described herein may be implemented. The environment may include a client device 900, host 906, host 916, host 950, backend platform 925, cloud computing environment 932, and a network 930. The devices of the environment may be connected through wired connections, wireless connections, or a combination of wired and wireless connections.

In an example embodiment, one or more portions of the network 930 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 925 may include one or more devices configured to host the application 100. The backend platform 925 may include a server or a group of servers. In an embodiment, the backend platform 925 may be hosted in a cloud computing environment 932. It may be appreciated that the backend platform 925 may not be cloud-based, or may be partially cloud-based.

The client device 900 may include application 902. The application 902 may be an executable application configured to interface with hosts 906, 916, or 950. Host 906 may include an index server 908, a script server 910, and partition 912 and 914 of a database table. The script server 910 may include a controller 960 and a worker 962. Host 916 may include an index server 918, a script server 920, and partition 922 and 924 of the database table. The script server 920 may include a worker 921. Host 950 may include an index server 952, a script server 954, and partition 956 and 958 of the database table. The script server 954 may include a worker 955. The partitions 912, 914, 922, 924, 956, and 958 may store persistence data of a database tables.

Each computing resource 926a-d includes one or more personal computers, workstations, computers, server devices, or other types of computation and/or communication devices. The computing resource(s) 926a-d may host the backend platform 925. The cloud resources may include compute instances executing in the computing resources 926a-d. The computing resources 926a-d may communicate with other computing resources 926a-d via wired connections, wireless connections, or a combination of wired or wireless connections.

Computing resources 926a-d may include a group of cloud resources, such as one or more applications ("APPs") 926-1, one or more virtual machines ("VMs") 926-2, virtualized storage ("VS") 926-3, and one or more hypervisors ("HYPs") 926-4.

Application 926-1 may include one or more software applications that may be provided to or accessed by client device 900. Alternatively, the application 926-1 may eliminate a need to install and execute software applications on the user device 310 and client device 360. The application 926-1 may include software associated with backend platform 925 and/or any other software configured to be provided across the cloud computing environment 932. The application 926-1 may send/receive information from one or more other applications 926-1, via the virtual machine 926-2.

Virtual machine 926-2 may include a software implementation of a machine (e.g., a computer) that executes programs like a physical machine. Virtual machine 926-2 may be either a system virtual machine or a process virtual machine, depending upon the use and degree of correspondence to any real machine by virtual machine 926-2. A system virtual machine may provide a complete system platform that supports execution of a complete operating system (OS). A process virtual machine may execute a single program and may support a single process. The virtual machine 926-2 may execute on behalf of a user and/or on behalf of one or more other backend platforms 925, and may manage infrastructure of cloud computing environment 932, such as data management, synchronization, or long duration data transfers.

Virtualized storage 926-3 may include one or more storage systems and/or one or more devices that use virtualization techniques within the storage systems or devices of computing resource 926a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 926-4 may provide hardware virtualization techniques that allow multiple operations systems (e.g., "guest operating systems") to execute concurrently on a host computer, such as computing resource 926a-d. Hypervisor 926-4 may present a virtual operating platform to the guest operating systems, and may manage the execution of the guest operating systems multiple instances of a variety of operating systems and may share virtualized hardware resources.

In an embodiment, a user may transmit instructions to host 906 to execute an algorithm on partitions 912, 914, 922, 924, 956, and 958, in parallel. The instructions may specify the algorithm, control data, and names of the partitions on which the algorithm is to be executed. The control data may be used along with persistence data stored in the partitions to execute the algorithm. The algorithm may be a predictive or machine learning algorithm.

The index server 908 of host 906 may receive the request. The index server 908 may forward the request to the script server 910. The script server 910 may include a controller 960. The controller 960 may transmit instructions to the hosts 916 and 950 to execute the algorithm on the respective partitions. The controller 960 may invoke the worker 962, 921, and 955 to execute the algorithm on the respective partitions in parallel. The worker may be an application function configured to execute the algorithm. The workers 962, 921, and 955 may execute the algorithm on the partitions 912, 914, 922, 924 and 956, 958, respectively.

In this regard, initial instances of the algorithm may be executed using control data and persistence data stored in partitions 912, 914, 922, 924, 956, 958, in parallel. Each instance may be executed using persistence data of a partition, independent of any other partition. The script servers 910, 920, and 954 may receive an output in response to executing initial instances of the algorithm on partitions 912, 914, 922, 924, 956, and 958. The script server 920 and 954 may transmit the respective output to the host 906. The controller 960 may determine whether the outputs received by script servers 910, 920, and 954 are satisfactory based on a predefined criteria. The predefined criteria may be specified by the client device 900. In response to determining an output of the multiple different outputs is unsatisfactory, the controller 960 may determine whether the control data needs to be modified. In one embodiment, the script server 910 may receive input from the application 902 to modify the control data based on the outputs. Alternatively, the script server 910 may automatically modify the control data based on the outputs. The controller 960 may transmit the instructions to the script servers 920 and 954 to re-execute the algorithm based using the modified control data.

As a non-limiting example, the client device 100 may be operated by a retail store and the algorithm may be configured to forecast sales using persistence data such as historical sales data stored in partitions 912, 914, 922, 924, 956, and 958. The control data may be anticipated customer traffic, product prices, upcoming promotion information, and/or the like. The index server 908 may receive the instructions to execute the algorithm to forecast sales data using persistence data stored in partitions 912, 914, 922, 924, 956, and 958 and control data. The index server 908 may forward the instructions to the script server 910. The controller 960 may transmit instructions for executing the algorithm to host 916 and 950. The controller 960 may invoke workers 962, 921, and 955 to execute the algorithm on the respective partitions. The workers 962, 921, and 955 may execute an instance algorithm using the control data and the persistence data stored in partitions 912, 914, 922, 924, 956, and 958, for each partition in parallel.

An output may be generated for each of the partitions 912, 914, 922, 924, 956, and 958. The output may include a value indicating the forecast sales data based on the persistence data stored in the respective partition and the control data. Furthermore, the output may include a confidence value indicating the confidence level of the accuracy of the forecast sales data. The script server 910 may receive the outputs for partition 912 and 914. The script server 920 may receive outputs for partition 922 and 924. The script server 950 may receive output for partition 956 and 958. The script servers 920 and 950 may send the outputs to the script server 910. The controller 960 may determine whether the confidence level in the outputs is more than a threshold amount. The controller 960 may determine that confidence level of an output is lower than a threshold amount. The controller 960 may modify the control data and re-execute an instance of the algorithm for each partition based on the modified control data. The controller 960 may re-execute an instance of the algorithm for each partition until the controller 960 determines that outputs to be satisfactory.

In an embodiment, the persistence data stored in the partitions 912, 914, 922, 924, 956, and 958 may be modified while the algorithm is executing the calculations in the algorithm. In the event, the controller 960 determines that at least one of the outputs are not satisfactory after an initial execution of the algorithm on the partitions 912, 914, 922, 924, 956, and 958, the workers 962, 921, and 955 may generate a state including the modified persistence data for each partition after the initial execution of the algorithm on the partition. The states may be stored in local memory 964, 966, and 968 of each host 906, 916, and 950. Each state may be assigned a unique identifier. The unique identifier may indicate the state and the corresponding partition. In response to re-executing the algorithm for each partition, the controller 960 may instruct the algorithm to execute the algorithm on the state for the corresponding partition rather than the persistence data stored in the partition. A new state may be generated each time the algorithm is re-executed on a partition. Each new state may be assigned a new unique identifier. By doing so, the algorithm is executed on a current state of a partition.

In an embodiment, the algorithm may be bound for executing the algorithm on the persistence data. However, the algorithm may include two inner calculations. The first inner calculation may be executed on the persistence data stored in the partitions during an initial execution of the algorithm. The second inner calculation may be executed on the state and a clone of the partition of the database table. The clone of the partition of the database table may not have data stored in the database table. For example, the host 906 may include a clone 912-1 of partition 912 and a clone 914-1 of partition 914. The host 916 may include a clone 922-1 of partition 922 and a clone 924-1 of partition 924. The host 950 may include a clone 956-1 of partition 956 and a clone 958-1 of partition 958.

The first inner calculation is executed once and it reads the persistence data from all partitions 912, 914, 922, 924, 956, and 958 and invokes the calculations of the algorithm in parallel for each partition. The worker instances transform the partition's persistence data and store the transformed data in states for further use. As of the next iteration the second inner calculation is executed. The second inner calculation does not read data from the persistence data stored in the partition, as it's based on an empty table, but invokes exactly the same number of workers as the first inner calculation, these instances identify the states created by the executing the first inner calculation scenario and execute the calculations on the state data. In response to the controller determining the outputs for each partition are satisfactory, the states stored in local memory may be purged.

Figure 10:
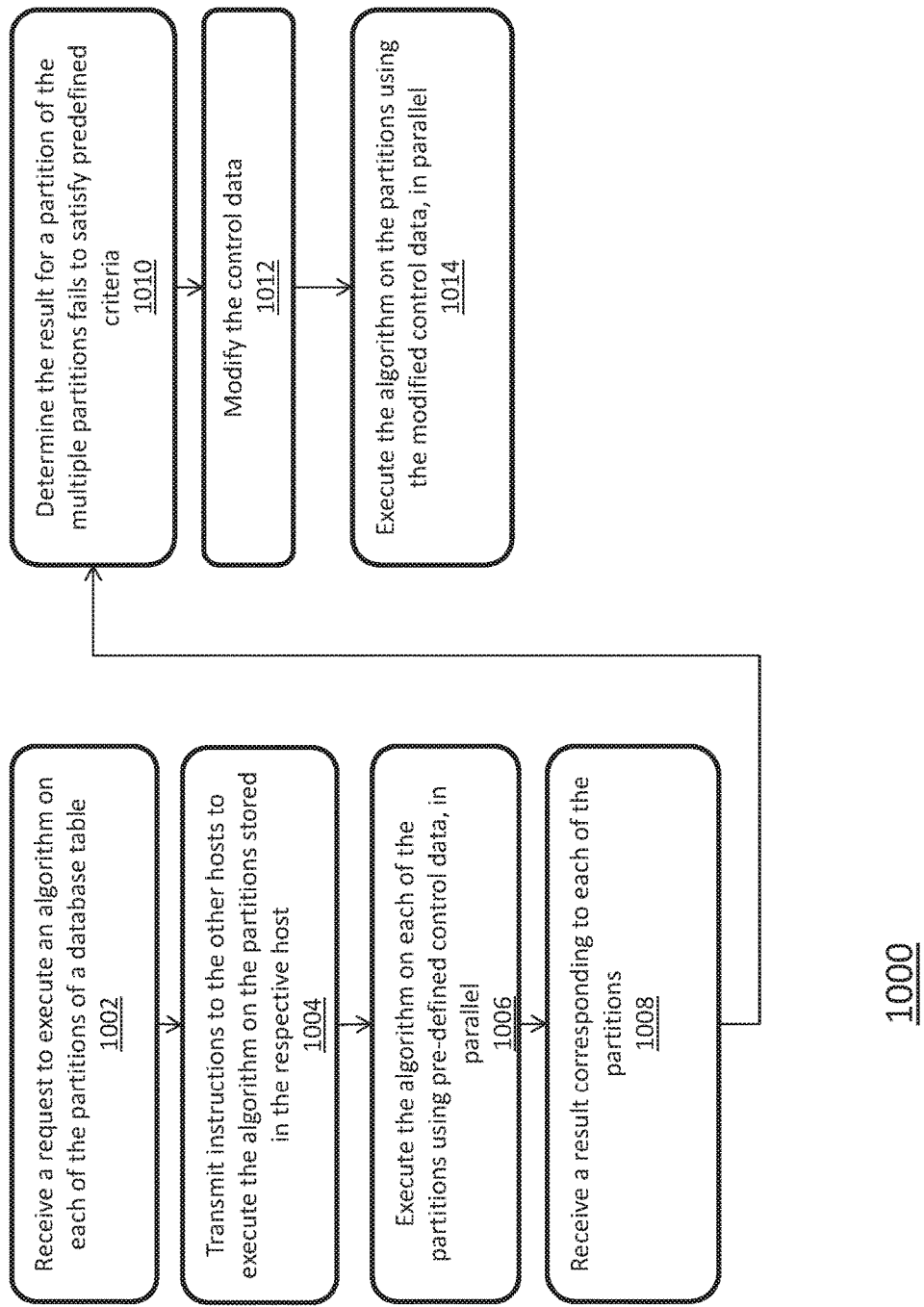
FIG. 10 is a flowchart illustrating the process of iteratively executing an application on partitioned data in accordance to an example embodiment

FIG. 10 is an example flowchart 1000 for iteratively executing an algorithm on partitioned data. It is to be appreciated the operations may occur in a different order, and some operations may not be performed. Merely as an example, the flow of data will be described with respect to FIG. 9.

In operation 1002, a host may receive a request to execute an algorithm on each of the partitions of a database table storing persistence data using predefined control data. The partitions may be distributed across multiple hosts or may reside on a single host.

In operation 1004, a controller of the host may transmit instructions to the other hosts to execute the algorithm on the partitions stored in the respective host.

In operation 1006, the controller may invoke a worker in each host to execute the algorithm on each of the partitions using the pre-defined control data, in parallel. The worker may be an application function configured to implement the algorithm.

In operation 1008, the controller may receive a result corresponding to each of the partitions in response to executing the instances of the algorithm. Each of the workers of the hosts may receive the output. The workers may transmit the output to the controller.

In operation 1010, the controller may determine the result for a partitions of the multiple partitions fails to satisfy predefined criteria. The predefined criteria may be specified by a user who transmitted the request.

In operation 1012, in response to determining to the result of the partition of the multiple partitions fails to satisfy the predefined criteria, the controller may modify the control data.

In operation 1014, the controllers may invoke the workers to execute the algorithm on the partitions using the modified control data, in parallel. The workers may iteratively execute instances of the algorithm on the partitions until the result corresponding to the partition satisfies the predefined criteria.

Figure 11:
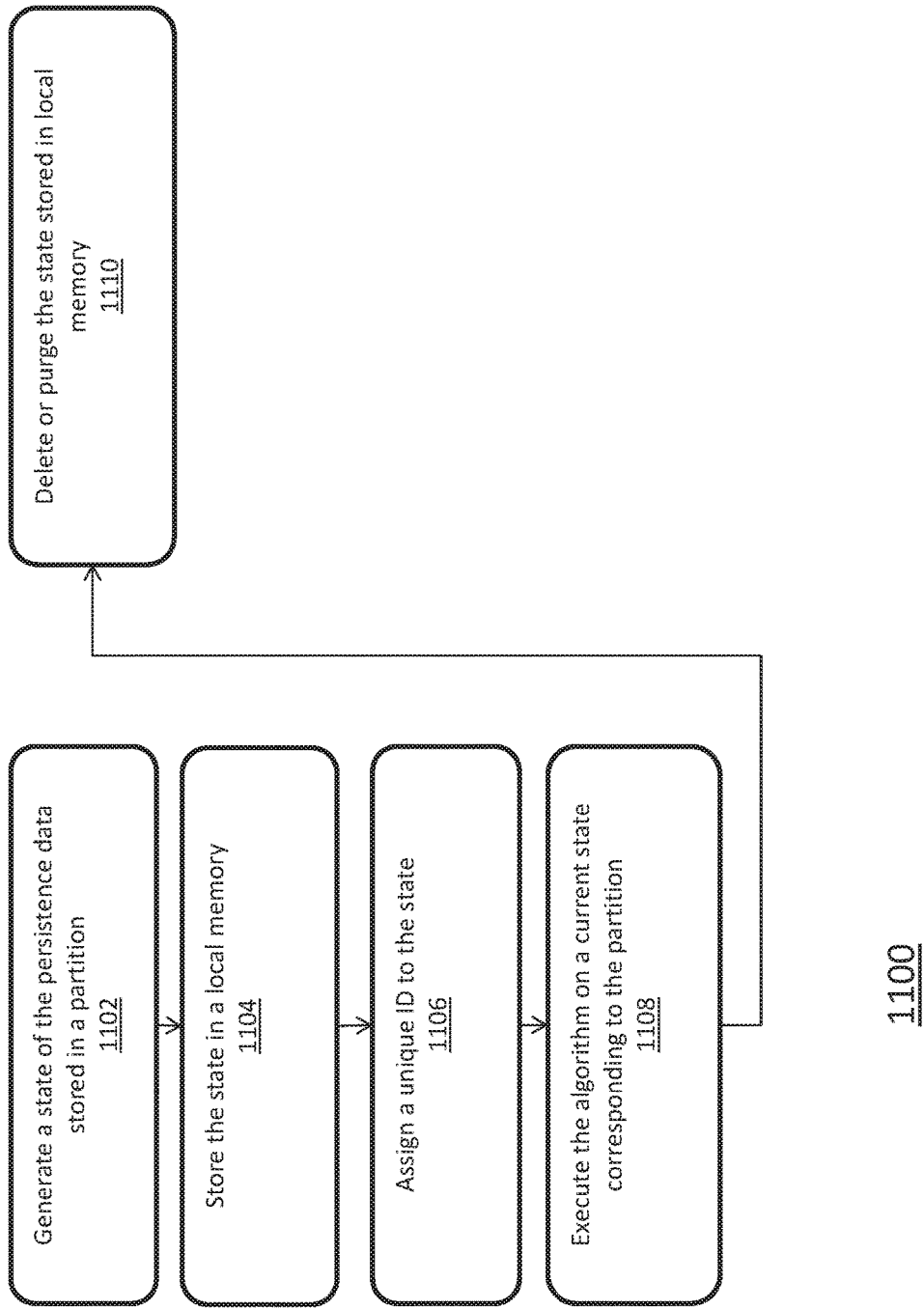
FIG. 11 is a flowchart illustrating the process of generating states of partitions in accordance to an example embodiment.

FIG. 11 is an example flowchart 1100 for iteratively executing an algorithm on partitioned data. It is to be appreciated the operations may occur in a different order, and some operations may not be performed. Merely as an example, the flow of data will be described with respect to FIG. 9.

In operation 1102, a worker of each of the hosts may generate a state of the persistence data stored in a partition, in response to executing an algorithm on the persistence data. The persistence data may be modified after the execution of the algorithm.

In operation 1104, the worker may store the state in a local memory.

In operation 1106, a controller may assign a unique ID to the state. The unique ID may identify the state and the corresponding partition.

In operation 1108, the controller may invoke a worker on each host to execute the algorithm on the current state of the partition using the unique identifier of the current state. The algorithm may also execute instructions included in the algorithm corresponding to the persistence data stored in the partition on an empty clone of the partition of the database table.

In operation 1110, in response to determining results from executing the algorithm are satisfactory, the workers from each host may delete or purge the state stored in local memory.

Figure 12:
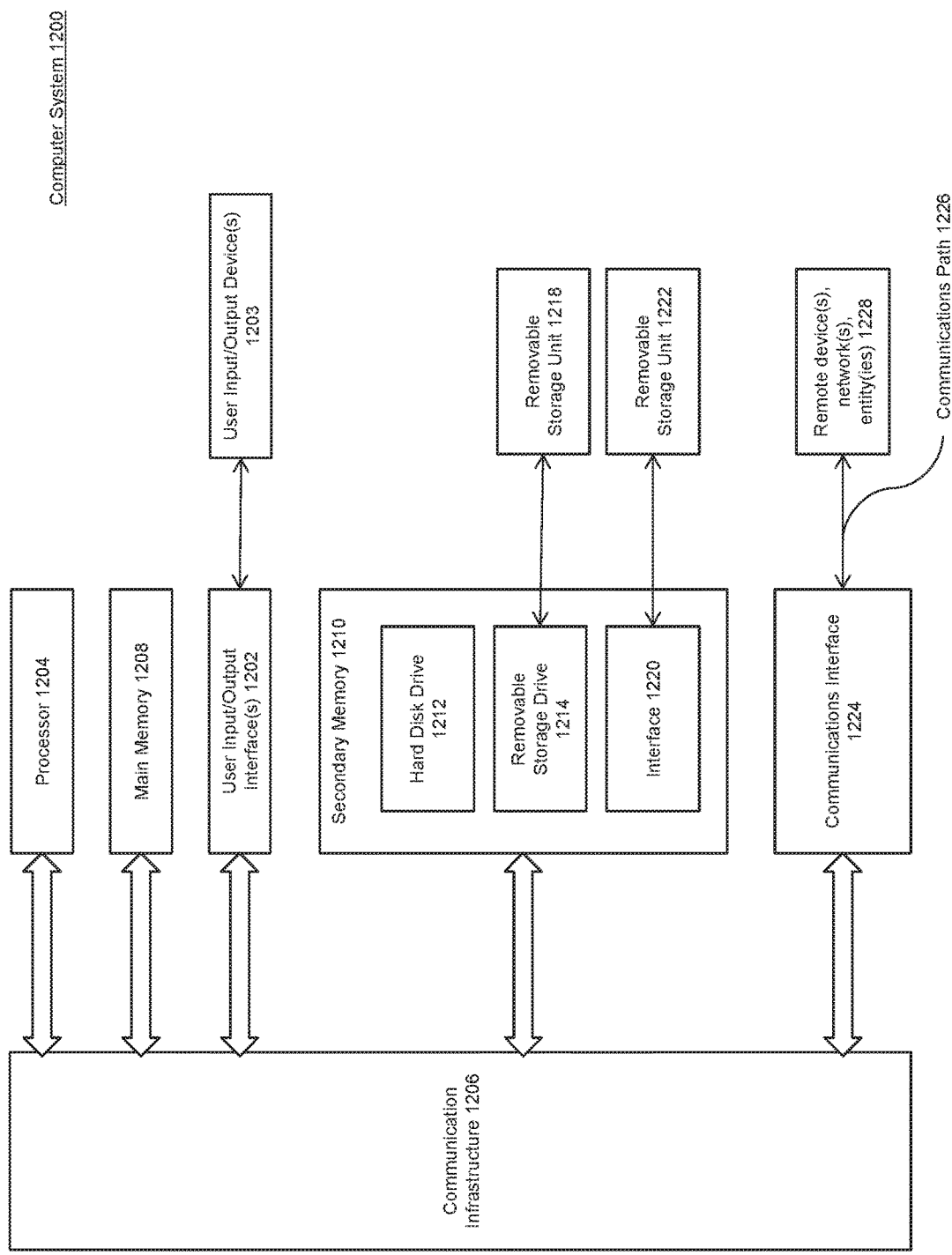
FIG. 12 is a block diagram of example components of a computing system according to an embodiment.

FIG. 12 is a block diagram of example components of device 1200. One or more computer systems 1200 may be used, for example, to implement any of the embodiments discussed herein, as well as combinations and sub-combinations thereof. Computer system 1200 may include one or more processors (also called central processing units, or CPUs), such as a processor 1204. Processor 1204 may be connected to a communication infrastructure or bus 1206.

Computer system 1200 may also include user input/output device(s) 1203, such as monitors, keyboards, pointing devices, etc., which may communicate with communication infrastructure 1206 through user input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214.

Removable storage drive 1214 may interact with a removable storage unit 1218. Removable storage unit 1218 may include a computer usable or readable storage device having stored thereon computer software (control logic) and/or data. Removable storage unit 1218 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
   receiving, by one or more computing devices, a request to execute an algorithm on each of a first set of partitions of a database table storing persistence data using predefined control data, the first set of partitions residing on a host server including a script server;
   invoking, by the one or more computing devices, the script server to execute a second set of instances of the algorithm on each of the first set of partitions using the predefined control data to produce a result for each of the first set of partitions, using a controller of the script server residing on the host server, wherein the execution of the second set of instances of the algorithm on each of the first set of partitions causes modification of the persistence data of at least one partition of the first set of partitions;
   generating, by the one or more computing devices, a state of the at least one partition, the state including the modified persistence data;
   storing, by the one or more computing devices, the state in local memory;
   determining, by the one or more computing devices, a result corresponding to the at least one partition of the first set of partitions fails to satisfy predefined criteria, using the controller;
   modifying, by the one or more computing devices, the control data, using the controller in response to determining that the result corresponding to the at least one partition fails to satisfy the predefined criteria;
   retrieving, by the one or more computing devices, the state of the at least one partition from the local memory; and
   re-executing, by the one or more computing devices, the algorithm on the state of the at least one partition using the modified control data.

2. The method of claim 1, further comprising purging, by the one or more computing devices, the state in response to the result of the partition corresponding to the partition satisfies the predefined criteria.

3. The method of claim 1, further comprising:
   iteratively re-executing, by the one or more computing devices, the second set of instances of the algorithm on the first set of partitions until the result corresponding to the partition satisfies the predefined criteria, wherein a new state of the partition is generated in response to each re-execution of the algorithm.

4. The method of claim 3, further comprising:
   assigning, by the one or more computing devices, a state identifier to each new state; and
   instructing, by the one or more computing devices, the algorithm to execute instructions on a current state corresponding to the partition, using a state identifier of the current state.

5. The method of claim 1, further comprising:
   generating, by the one or more computing devices, a clone of the partition, wherein the clone of the partition is void of persistence data stored in the partition; and
   executing, by the one or more computing devices, instructions included in the algorithm corresponding to the persistence data stored in the partition, on the clone of the partition, in response to re-executing the algorithm.

6. A non-transitory computer-readable medium storing instructions that when executed by one or more processors of a device cause the one or more processors to:
receive a request to execute an algorithm on each of a first set of partitions of a database table storing persistence data using predefined control data, the first set of partitions residing on a host server including a script server;
invoke the script server to execute a second set of instances of the algorithm on each of the first set of partitions using the predefined control data to produce a result for each of the first set of partitions, using a controller of the script server residing on the host server, wherein the execution of the second set of instances of the algorithm on each of the n partitions causes modification of the persistence data of at least one partition of the n partitions;
generate a state of the at least one partition, the state including the modified persistence data;
store the state in local memory;
determine a result corresponding to the at least one partition of the first set of partitions fails to satisfy predefined criteria, using the controller;
modify the control data, using the controller in response to determining that the result corresponding to the at least one partition fails to satisfy the predefined criteria;
retrieve the state of the at least one partition from the local memory; and
re-execute the algorithm on the state of the at least one partition using the modified control data.

7. A system comprising:
a memory;
a processor copulated to the memory, the processor configured to:
receive a request to execute an algorithm on each of a first set of partitions of a database table storing persistence data using predefined control data, the first set of partitions residing on a host server including a script server;
invoke the script server to execute a second set of instances of the algorithm on each of the first set of partitions using the predefined control data to produce a result for each of the n partitions, using a controller of the script server residing on the host server, wherein the execution of the second set of instances of the algorithm on each of the first set of partitions causes modification of the persistence data of at least one partition of the first set of partitions;
generate a state of the at least one partition, the state including the modified persistence data;
store the state in local memory;
determine a result corresponding to the at least one partition of the first set of partitions fails to satisfy predefined criteria, using the controller;
modify the control data, using the controller in response to determining that the result corresponding to the at least one partition fails to satisfy the predefined criteria;
retrieve the state of the at least one partition from the local memory; and
re-execute the algorithm on the state of the at least one partition using the modified control data.

8. The system of claim 7, wherein the processor is further configured to purge the state in response to the result of the partition corresponding to the partition satisfies the predefined criteria.

9. The system of claim 7, wherein the processor is further configured to:
iteratively re-execute the second set of instances of the algorithm on the first set of partitions until the result corresponding to the partition satisfies the predefined criteria, wherein a new state of the partition is generated in response to each re-execution of the algorithm.

10. The system of claim 9, wherein the processor is further configured to:
assign a state identifier to each new state; and
instruct the algorithm to execute instructions on a current state corresponding to the partition, using a state identifier of the current state.

11. The system of claim 7, wherein the processor is further configured to:
generate a clone of the partition, wherein the clone of the partition is void of persistence data stored in the partition; and
execute instructions included in the algorithm corresponding to the persistence data stored in the partition, on the clone of the partition, in response to re-executing the algorithm.

12. The non-transitory computer-readable medium of claim 6, wherein when executed by the one or more processors the instructions cause the processor to:
assign a state identifier to each new state; and
instruct the algorithm to execute instructions on a current state corresponding to the partition, using a state identifier of the current state.

13. The non-transitory computer-readable medium of claim 6, wherein when executed by the one or more processors the instructions cause the processor to:
iteratively re-execute the second set of instances of the algorithm on the first set of partitions until the result corresponding to the partition satisfies the predefined criteria, wherein a new state of the partition is generated in response to each re-execution of the algorithm.

14. The non-transitory computer-readable medium of claim 6, wherein when executed by the one or more processors the instructions cause the processor to:
generate a clone of the partition, wherein the clone of the partition is void of persistence data stored in the partition; and
execute instructions included in the algorithm corresponding to the persistence data stored in the partition, on the clone of the partition, in response to re-executing the algorithm.

* * * * *